US008891963B2

(12) United States Patent
Patel

(10) Patent No.: US 8,891,963 B2
(45) Date of Patent: Nov. 18, 2014

(54) HYBRID SIGNAL ROUTER

(75) Inventor: Rakesh Patel, Mississauga (CA)

(73) Assignee: Evertz Microsystems Ltd. (CA)

( * ) Notice: Subject to any disclaimer, the term of this patent is extended or adjusted under 35 U.S.C. 154(b) by 165 days.

(21) Appl. No.: 13/607,223

(22) Filed: Sep. 7, 2012

(65) Prior Publication Data

US 2013/0121692 A1 May 16, 2013

Related U.S. Application Data

(60) Provisional application No. 61/532,802, filed on Sep. 9, 2011.

(51) Int. Cl.
*H04Q 11/00* (2006.01)
*G02B 6/38* (2006.01)
*H04J 14/00* (2006.01)
*H04L 12/00* (2006.01)
*H04M 3/56* (2006.01)

(52) U.S. Cl.
CPC ............ *H04Q 11/0062* (2013.01); *H04L 12/00* (2013.01); *H04M 3/56* (2013.01)
USPC .................. 398/45; 398/42; 398/43; 398/54; 398/51; 370/465; 370/360; 370/535

(58) Field of Classification Search
USPC ............................................... 398/42, 43, 45
See application file for complete search history.

(56) References Cited

U.S. PATENT DOCUMENTS

| | | | |
|---|---|---|---|
| 5,099,471 A * | 3/1992 | Tsukada et al. ................. 398/98 |
| 5,450,225 A * | 9/1995 | Bostica et al. .................. 398/54 |
| 5,506,904 A * | 4/1996 | Sheldrick et al. ............. 380/212 |
| 5,677,728 A * | 10/1997 | Schoolman ................ 348/14.15 |
| 6,647,208 B1 * | 11/2003 | Kirby ............................... 398/45 |
| 6,665,495 B1 * | 12/2003 | Miles et al. ...................... 398/54 |
| 8,559,826 B2 * | 10/2013 | Hongo et al. .................. 398/155 |
| 2001/0017866 A1 * | 8/2001 | Takada et al. .................. 370/535 |
| 2002/0004390 A1 * | 1/2002 | Cutaia et al. ................... 455/424 |

(Continued)

FOREIGN PATENT DOCUMENTS

| | | |
|---|---|---|
| WO | 2010045732 A1 | 4/2010 |
| WO | 2010083586 A1 | 7/2010 |
| WO | 2010126667 A1 | 11/2010 |

OTHER PUBLICATIONS

International Search Report & Written Opinion issued in corresponding PCT application No. PCT/CA2012/000840.

*Primary Examiner* — Oommen Jacob
(74) *Attorney, Agent, or Firm* — Bereskin & Parr LLP/S.E.N.C.R.L., s.r.l.

(57) ABSTRACT

Various signal routing systems are disclosed. Some routing systems include a crosspoint switch or switching fabric for coupling input ports to output ports, allowing an input signal received at one of the input ports to be transported to one or more of the output ports. The systems may include aggregation or compression modules to allow multiple input signals to be combined into one or more compressed signals, which may be converted into optical signals for transmission to a communication network. In some embodiments, the communication network may include a packet switched router which extracts some of the input signals from the optical signals and produced corresponding packetized signals that are coupled to output ports. Some routing system may include only a packet switched router. Some routing systems may be configured to receive compressed or aggregated signals and to decompress or deaggregate such signals to form individual signals as output signals.

30 Claims, 5 Drawing Sheets

(56) References Cited

U.S. PATENT DOCUMENTS

| | | | |
|---|---|---|---|
| 2002/0136207 A1* | 9/2002 | Matsumoto et al. | 370/352 |
| 2003/0152392 A1* | 8/2003 | Mansbridge | 398/199 |
| 2003/0210870 A1* | 11/2003 | Graves | 385/71 |
| 2004/0208172 A1* | 10/2004 | Ovadia et al. | 370/360 |
| 2005/0058462 A1* | 3/2005 | Talebpour et al. | 398/199 |
| 2005/0286908 A1* | 12/2005 | Way | 398/186 |
| 2006/0159454 A1* | 7/2006 | Bjornstad | 398/51 |
| 2007/0195815 A1* | 8/2007 | Turner et al. | 370/465 |
| 2008/0118245 A1* | 5/2008 | Chang et al. | 398/79 |
| 2010/0228806 A1* | 9/2010 | Streicher et al. | 708/203 |
| 2012/0033968 A1* | 2/2012 | Testa et al. | 398/47 |
| 2013/0121692 A1* | 5/2013 | Patel | 398/45 |

* cited by examiner

HYBRID SIGNAL ROUTER

FIELD

The embodiments disclosed herein relate to systems and methods for switching and routing signals including video signals and audio/video signals.

BACKGROUND

In recent years, the availability of high quality video signals, including audio/video signals, has increased substantially. At the same time, the number of sources of video signals has increased rapidly. Modern video production and processing facilities, such as television stations and cable and satellite broadcasters must frequently use and process a large number of high bandwidth signals simultaneously. The video signal processing systems in such facilities must be able to receive, store and provide large numbers of such signals. There exists a need for video signal switching and routing systems and methods capable of handling large numbers of video signals including video signals having a high bandwidth.

SUMMARY

In one aspect, the disclosed embodiments provide a signal routing system comprising: a plurality of input ports for receiving a plurality of input signals; a plurality of output ports for transmitting a plurality of output signals; a crosspoint switch for coupling each of the input ports to one or more of the output ports to allow each input signal to be coupled to one or more output ports; an aggregation module for combining a plurality of input signals into a one or more compressed signals, wherein each of the compressed signals corresponds to two or more of the input signals; and an optical aggregation module for combining a plurality of the compressed signals into an optical signals corresponding to a plurality of the inputs signals, wherein the optical aggregation module is coupled to a communication network.

In some embodiments, the system includes an optical deaggregation module coupled to the communication network for receiving an optical signal and deaggregating a plurality of compressed signals from the optical signal and a deaggregation module for deaggregating the compressed signals to form video signals corresponding to the received optical signal, wherein the deaggregation module is coupled to the crosspoint switch to provide the video signals to the crosspoint switch, wherein the crosspoint switch may be configured to couple the video signals to one or more of the output ports.

In some embodiments, the system includes a controller coupled to the crosspoint switch to coordinate the operation of the crosspoint switch with other components of the system.

In some embodiments, at least some of the input signals are electrical signals and wherein the crosspoint switch is configured to switch electrical domain signals between the input ports and output ports.

In some embodiments, at least some of the input signals are optical signals and wherein the crosspoint switch is configured to switch electrical domain signals between the input ports and output ports.

In some embodiments, the aggregation module includes one or more signal compression modules.

In some embodiments, the aggregation module includes one or more signal multiplexing modules.

In another aspect, the described embodiments provide signal routing system comprising: a plurality of input cards for receiving a plurality of input signals; a plurality of output cards for transmitting a plurality of output signals; a crosspoint switch coupled to the input cards and to the output cards for receiving at least some of the input signals and for switching at least some of the input signals to one or more of the output cards; and a packet switched router coupled to the input cards for receiving one or more optical signals, each of the optical signals corresponding to one or more of the input signals.

In some embodiments, at least some of the input cards include: one or more input ports for receiving a plurality of electrical domain input signals; an aggregation module for combining a plurality of input signals into a one or more of the compressed signals; and an optical aggregation module for combining a plurality of the compressed signals into an optical signals corresponding to a plurality of the inputs signals, wherein the optical aggregation module is coupled to the packet switched router.

In some embodiments, at least some of the input cards include: one or more input ports for receiving one or more optical domain input signals.

In some embodiments, the system includes one or more signal extraction modules, wherein at least some of the signal extraction modules are coupled between one of the input cards and the packet switched router to receive optical signals and to provide packetized signals corresponding to one or more input signals to the packet switched router.

In some embodiments, the system includes one or more signal transmission modules for retrieving packetized signals from the packet switched router and for providing one or more compressed optical signals corresponding to the retrieved packetized signals.

In some embodiments, at least some of the signal transmission modules is coupled to one of the output cards to provide one or more compressed optical signals to the coupled output card.

In some embodiments, the coupled output cards include an optical deaggregation module and an electrical deaggregation module for providing one of more output signals corresponding to a packetized signal included in a compressed optical signal.

In some embodiments, the system includes a controller coupled to the crosspoint switch to coordinate the operation of the crosspoint switch with other components of the system.

In some embodiments, the system includes a controller coupled to the packet switched router to coordinate the operation of the packet switched router with other components of the system.

In another aspect, the described embodiments provide a method of routing signals, the method comprising: receiving a plurality of input signals at a plurality of input ports; coupling at least some of the signals to a crosspoint switch, wherein the crosspoint switch is coupled to a plurality of output ports; within the crosspoint switch, coupling at least some of the input ports to one or more of the output ports thereby transporting at least some of the input signals to such output ports; generating one or more optical signals, wherein each of the optical signals corresponds to one or more of the input signals; and providing the optical signals to a communication network.

In some embodiments, the system includes generating the optical signals by aggregating one or more of the input signals.

In some embodiments, the method includes generating the optical signals by aggregating one or more of the input signals in the electrical domain and in the optical domain.

In some embodiments, the method includes aggregating the input signals by compressing the input signals.

In some embodiments, the method includes aggregating the input signals by multiplexing the input signals.

In some embodiments, the method includes receiving optical signals from the communication network and deaggregating the received optical signals to extract one or more signals encoded in the received optical signals.

In some embodiments, the method includes coupling the extracted signals to the output ports.

In another aspect, the described embodiments provide a method of routing signals, the method comprising: receiving a plurality of input signals at a plurality of input ports; coupling at least some of the signals to a crosspoint switch, wherein the crosspoint switch is coupled to a plurality of output ports; within the crosspoint switch, coupling at least some of the input ports to one or more of the output ports thereby transporting at least some of the input signals to such output ports; generating one or more optical signals, wherein each of the optical signals corresponds to one or more of the input signals; and providing the optical signals to a packet switched router.

In some embodiments, the method includes extracting one or more input signals from the one or more optical signals; converting each of the extracted input signals into a packetized signal; and storing each of the packetized signals in a memory module of the packet switched router.

In some embodiments, the method includes retrieving one or more packetized streams from the memory module; and generating one or more compressed optical signals corresponding to the retrieved packetized streams.

In some embodiments, the method includes deaggregating at least some of the compressed optical signals to form one or more output signals and providing the output signals at one or more of the output ports.

In some embodiments, at least some of the input signals are electrical domain signals.

In some embodiments, the method includes at least some of the input signal are optical domain signals.

These and other aspects are described further below.

BRIEF DESCRIPTION OF THE DRAWINGS

Several example embodiments are described below with reference to the drawings, in which.

DETAILED DESCRIPTION OF EXAMPLE EMBODIMENTS

Figure 1:
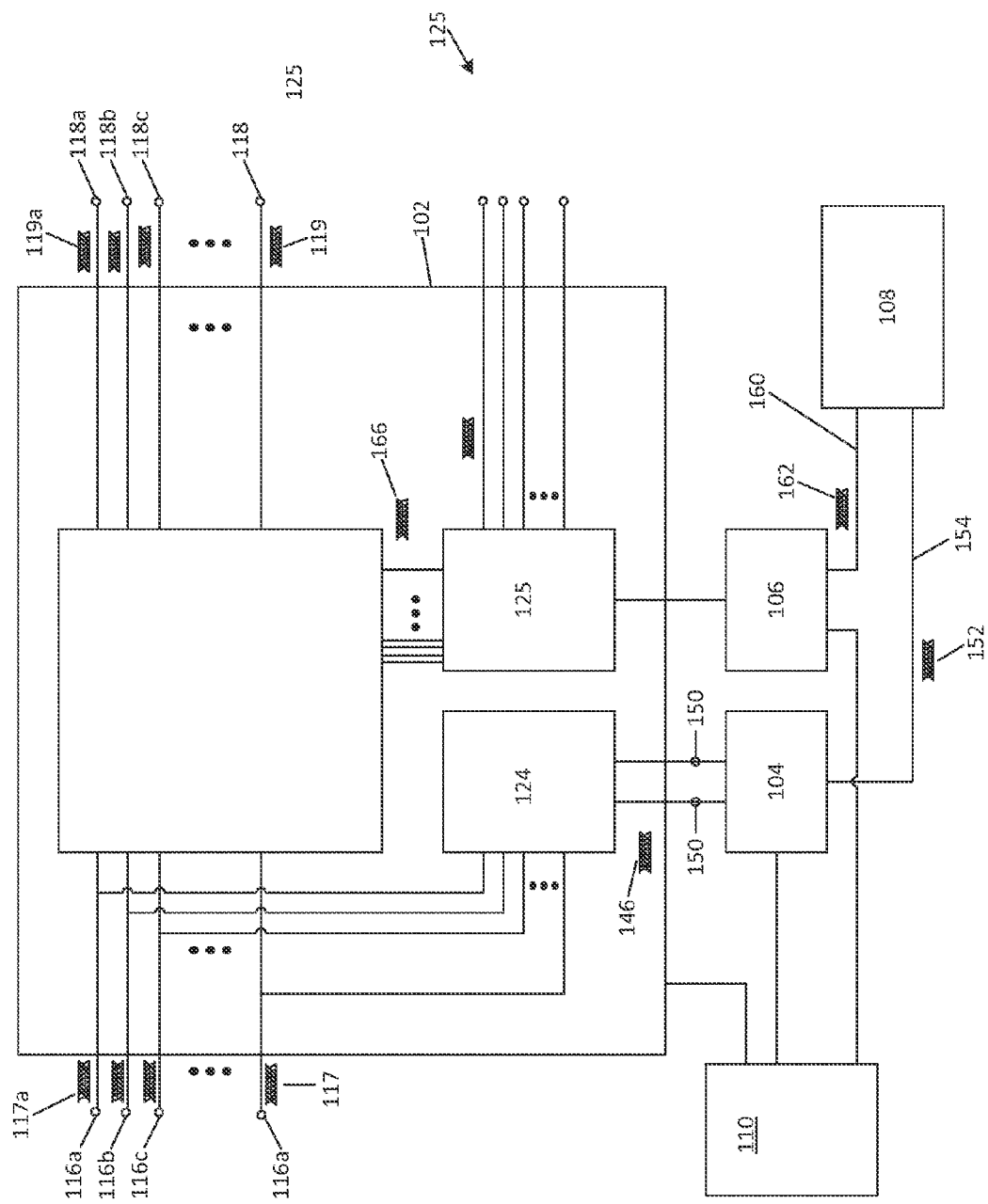
FIG. 1 illustrates a first signal routing system.

It will be appreciated that numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein.

Furthermore, this description is not to be considered as limiting the scope of the embodiments described herein in any way, but rather as merely describing implementation of the various embodiments described herein.

The embodiments of some of the methods, systems and apparatus described herein may be implemented in hardware or software, or a combination of both. These embodiments may be implemented in computer programs executing on programmable computers, each computer including at least one processor, a data storage system (including volatile memory or non-volatile memory or other data storage elements or a combination thereof), and at least one communication interface. Program code is applied to data to perform the functions described herein and to generate output information. The output information is applied to one or more output devices, in known fashion. In some embodiments, the communication interface may be a network communication interface. In embodiments in which elements of the invention are combined, the communication interface may be a software communication interface, such as those for inter-process communication (IPC). In still other embodiments, there may be a combination of communication interfaces implemented as hardware, software, and combination thereof.

Each program may be implemented in a high level procedural or object oriented programming or scripting language, or both, to communicate with a computer system. For example, a program may be written in XML, HTML 5, and so on. However, alternatively the programs may be implemented in assembly or machine language, if desired. The language may be a compiled or interpreted language. Each such computer program may be stored on a storage media or a device (e.g. ROM, magnetic disk, optical disc), readable by a general or special purpose programmable computer, for configuring and operating the computer when the storage media or device is read by the computer to perform the procedures described herein. Embodiments of the system may also be considered to be implemented as a non-transitory computer-readable storage medium, configured with a computer program, where the storage medium so configured causes a computer to operate in a specific and predefined manner to perform the functions described herein.

Furthermore, the methods, systems and apparatus of the described embodiments are capable of being distributed in a computer program product including a physical non-transitory computer readable medium that bears computer usable instructions for one or more processors. The medium may be provided in various forms, including one or more diskettes, compact disks, tapes, chips, magnetic and electronic storage media, and the like. The computer useable instructions may also be in various forms, including compiled and non-compiled code.

Reference is first made to FIG. 1, which illustrates a signal routing system 100. System 100 includes an electrical-domain signal router 102, an optical signal aggregation module 104, an optical signal deaggregation module 106, a communication network 108 and a controller 110. Controller 110 is coupled to the router 102, aggregation module 104 and deaggregation module 106 to coordinate and control their respective and collective operations.

Router 102 has a plurality of input ports 116, a plurality of output ports 118 and includes a switching fabric 120 and an electrical domain signal aggregation module 124.

The switching fabric 120, which can also be referred to as a crosspoint or a crosspoint switch, can be configured to couple an input signal 117 received at any of the input ports 116 to any of the output ports 118 as an output signal 119. Router 102 is coupled to and receives control signals from controller 110. Router 102 is responsive to the control signals to configure the switching fabric 120 to achieve a desired coupling between the input ports 116 and the output ports 118. In some embodiments, router 102 may include input processing elements that process input signals 117 to generate versions of the input signals that are then provided to the switching fabric 120. In some embodiments, router 102 may include output processing elements that process signals received from the switching fabric to generate versions of the input signals 117 which are then provided at the output ports as output signals 119. The switching fabric 120 may be a physical switching structure that electrically couples input ports 116 to one or more output ports 118 or it may be a logical switching structure that utilizes buffers, such as first in-first out buffers, to store input signals (or versions of input signals). The buffered signals are then recalled from the buffers and provided (in their buffered form or in a version of the buffered form) as output signals 119. The switching fabric effectively provides a point-to-point coupling between an input port 116 and one or more output ports 118.

The number of input ports 116 and output ports 118 provided in a router can vary and can be expressed in the form Number of Input Ports×Number of Output Ports. This can be referred to as the size of a router. For example, a router having 576 input ports and 576 output ports can be said to have a size of 576×576. Routers can have various sizes, including systems smaller than 576×576 and others that are larger. Routers used to switch media signals such as video signals and video transport streams may be used to switch a variety of different signals types that have different bit rates and bandwidth requirements for the transmission and switching devices through which the signals pass. For example, some standard definition video signals may have a bit rate of 143 Mbit/s or 270 Mbit/s (SD-SDI), while high definition video signals may have a bit rate of 1.485 Gbit/s (HD-SDI). Other signals may have a higher bit rate of 2.970 Gbit/s (3G-SDI). These signals types are only examples of the many different SDI (serial digital interface) signals standards issued by the Society of Motion Picture and Television Engineers (SMPTE). Other groups have issued various other standards for video signals and video routers may be typically be capable of transporting and switching some or all of these many different signal types.

Figure 2:
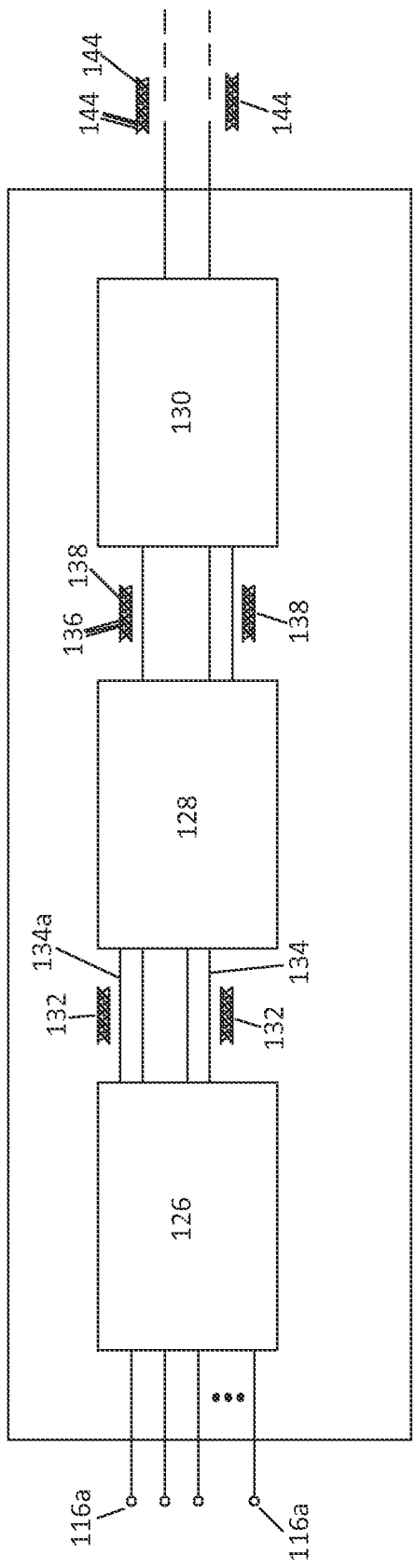
FIG. 2 illustrates an aggregation module of the system of FIG. 1.

Reference is made to FIG. 2, which illustrates aggregation module 124 in greater detail. Aggregation module 124 includes a time-division-multiplexing (TDM) module 126, a mathematically lossless compression module 128 and a visually lossless compression module 130. Each of the input signals 117 received at an input port 116 is also coupled to aggregation module 124.

Groups of inputs signals 117 are combined into a TDM signal 132 in which the signals in each group are time division multiplexed. For example, the input signals 117 may be grouped into groups of two or more signals, which may then be time division multiplexed into a single TDM signal 132. By combining multiple input signals 117 into a set of TDM signals, the number of individual signals that must be transported can be reduced. The number of input signals 117 that can be combined into a single TDM signal 132 will typically depend on the bitrate of the input signals and bandwidth of the transmission line or cable 134 used to transport the TDM signals. For example, three input signals 117a-c in a 3G-SDI format (having a bitrate of 2.970 GBit/s) may be time division multiplexed in a single TDM signal transported on a 10 GB/s transmission line 134a (which is often referred to as a 10 GigE transmission line). The input signals 117 combined in a TDM signal may have different bitrates. Larger groups of input signals that have a smaller total bitrate may be combined in a TDM signal that can be transmitted on a particular transmission line.

Typically, the input signals 117 will be combined into a plurality of TDM signals 132 by the TDM module 126. For example, 576 3G-SDI signals can be combined into 192 TDM signals that can be transported on 192 10 GB/s transmission lines. The TDM module 126 will typically include two or more TDM components to handle the total number of input signals 117 on real time so that a plurality of TDM signals 132 may be assembled simultaneously.

The TDM signals 132 are then coupled to mathematically lossless compression module 128, which compresses the signals to reduce the bandwidth required to transmit the signals. Mathematically lossless compression module 128 extracts each video signal 117 from its TDM signal 132 and applies a compression algorithm to the video signal to produce a corresponding lossless compressed signal 136, which has a reduced amount of data compared to the original video signal 117. The compression algorithm applied is mathematically lossless such that the original video signal 117 may be recreated by applying a mathematical decompression algorithm to the corresponding lossless compressed signal 136. The mathematically lossless compression of the video signals reduces their total bitrate and allows a larger number of signals to be combined a single transmission line of a given bandwidth. For example, if mathematically lossless compression module 128 can compress the input signals 117 into lossless compressed signals 136 having half the bitrate of the original input signals, then twice as many inputs signals may be combined in a TDM signal on a given transmission line. In this example, up to six 3G-SDI signals could be combined on a single 10 GB/s transmission line. The mathematically lossless compression module 128 combines the lossless compress signals 136 into a set of lossless compressed TDM signals 138, each of which will typically contain more individual signals corresponding the original input signals 117 that the TDM signals 132. The lossless compressed TDM signals 138 are transmitted on transmission lines 140. Typically, the visually lossless compression module 130 may contain a plurality of lossless compression components to simultaneously compress the input signals 117 and to produce the In the example give above of 576 3G-DSI signals that could be combined into 192 TDM signals 132, if these signals can be compressed on a 2:1 compression ratio by the mathematically lossless compression module 128, then they can be combined into 96 lossless compressed TDM signals 138 transmitted on 96 10 GB/s transmission lines 140.

The lossless compressed TDM signals 138 are then coupled to visually lossless compression module 130. Visually lossless compression module 130 extracts the lossless compressed signals applies a further compression on the lossless compressed signals 136 to produce a visually compressed signal 144 for each lossless compressed signal 136. Visually lossless compression module 130 applies a visually lossless compression by removing components of an original video signal 117 that would not normally be observed (or would only be marginally observed) by viewers of a reproduction of the video signal. Various visually lossless compression algorithms may be used to compress different types of video signals or to achieve different degrees of compression. For example, visually lossless compression algorithms such as color space reduction, chroma subsampling, transform coding or fractal compression may be applied to reduce the size of a video signal without affecting the quality of the reproduced signal when viewed. These lossy compression algorithms will typically produce a compressed video signal that cannot be decompressed to produce a signal identical to the original video signal. However, by selecting parameters of the compression algorithm the degree of compression and any visual effect of compression may be limited or effectively eliminated. A skilled person will be able to select a compression algorithm and parameters to achieve a desired balance between compression and video signal quality.

In some embodiments, a visually lossy compressed signal may be acceptable, and the compression module 130 may implement a visually lossy compression algorithm.

The visually compressed signals 144 corresponding to the original input signal 117 are time multiplexed into TDM visually compressed signals 146. The number of visually compressed signals 144 that may be combined into a single TD visually compressed signal 146 that can be transported on a particular Depending on the degree of compression provided by the visually lossless compression module 130, a greater number of visually compressed signals 144 may be combined in a single TD visually compressed signal 146 that can be carried on a particular transmission line than the number of lossless compressed signals 136 combined in a lossless compressed TDM signal 138 transmitted on the same transmission line. For example, if a 3G-SDI signal that has already been compressed to form a lossless compressed signal 136 can further be compressed to provide a visually compressed signal that has a third of the bitrate of the lossless compressed signal, then eighteen such visually compressed signals can be combined into a single TDM visually compressed signal 146 that can be transmitted on a 10 GB/s transmission line. In situations where visually compressed version of smaller signals (such as HD-SDI, SD-SDI and other signals have a lower bit rate than a 3G-SDI signal) are included in a TDM visually compressed signal 146, then a larger number of such signals could be combined in a TDM visually compressed signal that can be transmitted on a single 10 GB/s transmission line.

In various embodiments, input signals may be compressed and multiplexed using various formats and combinations of techniques to provide compressed signals 146 in various manners, depending on the characteristics of the input signals, the communication links between the components of system 100 and the desired bandwidth for the compressed signals 146 and any intermediate signals used to form the compressed signals 146.

If a router 102 (FIG. 1) receives 576 3G-SDI input signals 117, the processing the input signals 117 through aggregation module 124 will result of 192 TDM signals 132, 96 lossless compressed signals 136 and 32 TDM visually compressed signals 146. If some or all of the inputs signals 117 have a bit rate lower than a 3G-SDI signal then visually lossless compressed versions of the signals could be combined into fewer than 32 TDM visually compressed signals 146.

Referring again to FIG. 1, router 102 provides the TDM visually compressed signals 146 at a plurality of compressed signal output ports 150. The TDM visually compressed signals are coupled to optical signal aggregation module 104. Optical signal aggregation module 104 converts the TDM visually compressed signals 146 into corresponding compressed optical signals 152. The optical signals 152 are then transmitted using wavelength division multiplexing (WDM) to transmits the optical signals 152 in groups on one or more optical fibers 154. The number of optical fibers 154 required to carry on the optical signals 152 will depend on the number of optical signals 152, and the WDM protocol applied. For example, if the optical aggregation module utilizes a coarse WDM (CWDM) protocol, then 32 optical signals 152 may typically be grouped into two groups of 16 signals and transmitted on two optical fibers. If the optical aggregation module utilizes a dense WDM (DWDM) protocol, it may be possible to transmit 32 or more optical signals 152 on a single optical fiber 154.

The optical signals 152 are transported on fibers 154 to communication network 108, which receives the optical signals 152 and can provide the optical signals to other devices coupled to communication network 108. In some embodiments, communication network 108 may be capable to transmitting both optical and electrical signals. In some embodiments, the communication network may also include a wavelength division de-multiplexer 158 that can extract individual compressed optical signals 152 from the optical fiber 154. The extracted compressed optical signals 152 may be transmitted through network 108 to devices coupled to the network.

Router 102 may also receive optical signals from the network 108. To receive signal optical signals from the network 108, router 102 is coupled to network 108 through an optical signal deaggregation module 106. Optical deaggregation module 106 provides the opposite operation of aggregation module 104. Optical deaggregation module 106 receives optical signals 162 from network 108 across one or more optical fibers 160. The signals may be received in a WDM format or they may not be transmitted with other optical signals. The optical deaggregation module 106 converts the received optical signals 162 into corresponding compressed signals 164. The compressed signals 146 are provided to an electrical domain deaggregation module 125 within router 102.

Deaggregation module 125 deaggregates the compressed signals 164 to produce individual video signals. If the content of the compresses signals 164 is similar to the TDM visually compressed signals 146 described above, then deaggregation module 125 may include a visually lossless decompression module, a mathematically lossless decompression module and a time division demultiplexing module which are applied to reverse the operations described above in relation to aggregation module 124. The deaggregation module 125 decompresses and demultiplexes the compressed signals 164 to produce individual video signals 166. The video signals 166 may be coupled to the switching fabric 120, through which they may be coupled to output ports 118 that are coupled to the switching fabric. The video signals may also be coupled to output ports 118 without be switched through the switching fabric.

Deaggregation module 125 may include various components to decompress, demultiplex and otherwise extract video signals 166 from the compressed signals 164. In some embodiments, the compressed signals 164 may be in one or more particular format and the deaggregation module 125 is adapted to process the particular formats to provide the video signals 166. In other embodiments, the compressed signals 164 may be received in various formats according to various compression and multiplexing standards. Some signals received by the deaggregation module may not be compressed or may not be multiplexed. In such embodiments, the deaggregation module contains decompression and demultiplexing components to process such signals to provide the video signals 166.

In some embodiments, the electrical aggregation module 124 may similarly include various multiplexing and compression modules to provide signals to the optical aggregation module 104 in various formats as required for other devices coupled to the network 108.

Figure 3:
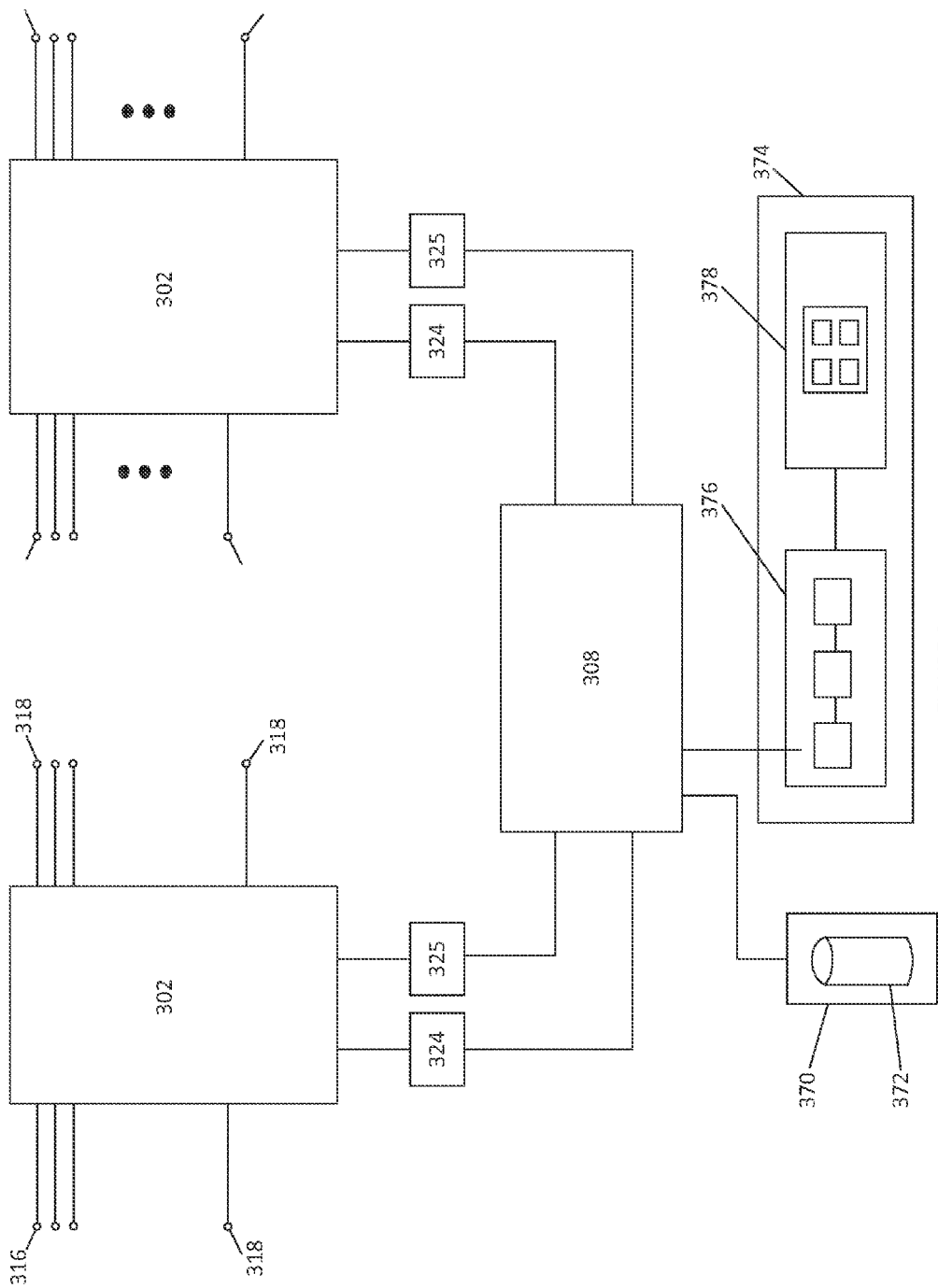
FIG. 3 illustrates another signal routing system.

Reference is next made to FIG. 3, which illustrates a system 300. Components of system 300 that are similar to components of system 100 are identified by similar reference numerals. System 300 includes several routers 302 that are coupled to network 308 through aggregation module 324 and deaggregation module 325, in the manner described above in relation to router 102, aggregation module 124, deaggregation module 125 and network 108.

Network 308 may have various devices and systems coupled to it. For example, in this embodiment, a digital video server 370 is coupled to the communication network 308. Digital video server 370 includes a data storage element 372 in which the signals may be recorded for later retrieval and transmission to other devices.

Compressed optical signals 352 provided by aggregation modules 324 may be transmitted to the digital video server 370. Within the digital video server 370, the compressed optical signals are processed to extract versions of the video signals encoded in the compressed optical signal. The versions of the video signals are stored in the storage element 372. The stored versions may be visually lossless compressed versions, mathematically compressed versions or decompressed versions of the original video signals. The versions are generated by suitable decompressing and demultiplexing components in the digital video server.

The versions of video signals may be transmitted across network 308 to routers 302 or to other devices coupled to the network 308.

A wide variety of devices may be coupled to the network 308. For example, a viewer system 374 may be coupled to network 308. Viewer system 374 receives versions of video signals from digital video server 370. The viewer system 374 includes a processing module 376 a viewer module 378. The processing module 376 includes processing elements to convert the received versions of the video signals into displayable video signals. Such processing elements may include decompressors and demultiplexers. In addition, the processing elements may include rescalers and format converters to provide video signals in a format suitable for display at the viewer module 378.

In some embodiments, the viewer module 378 may be a simple display screen that receives a single video signal from the processing module 376 and displays the video signal. In other embodiments, the viewer module 378 may be a multi-image display system that receives multiple video signals and displays them on one or more display screens. The viewer module 378 may receive video signals in one or more formats. For example, the processing module 376 may provide some or all of the video signals in a standardized format such as a common interchange format, which is then processed and displayed by the viewer module 378.

System 100 and the variations described are only examples of the present invention. Many variations are possible. For example, other systems may implements a different combination of multiplexors or compressors (or both) to combine and compress multiple input signals received in one or more video signal formats into a compressed signals that can be transmitted using less bandwidth or on fewer cables than the set of original video signals.

For example, in some systems, the electrical domain signal aggregation module may implement a visually lossless (or visually lossy) compression, followed by a mathematically lossless (or mathematically lossy) compression, followed by a TDM module. The corresponding electrical domain deaggregation module would implement a TDM demultiplexing stage, followed by a mathematical decompression and then a visual decompression to recreate versions of the original signals.

Figure 4:
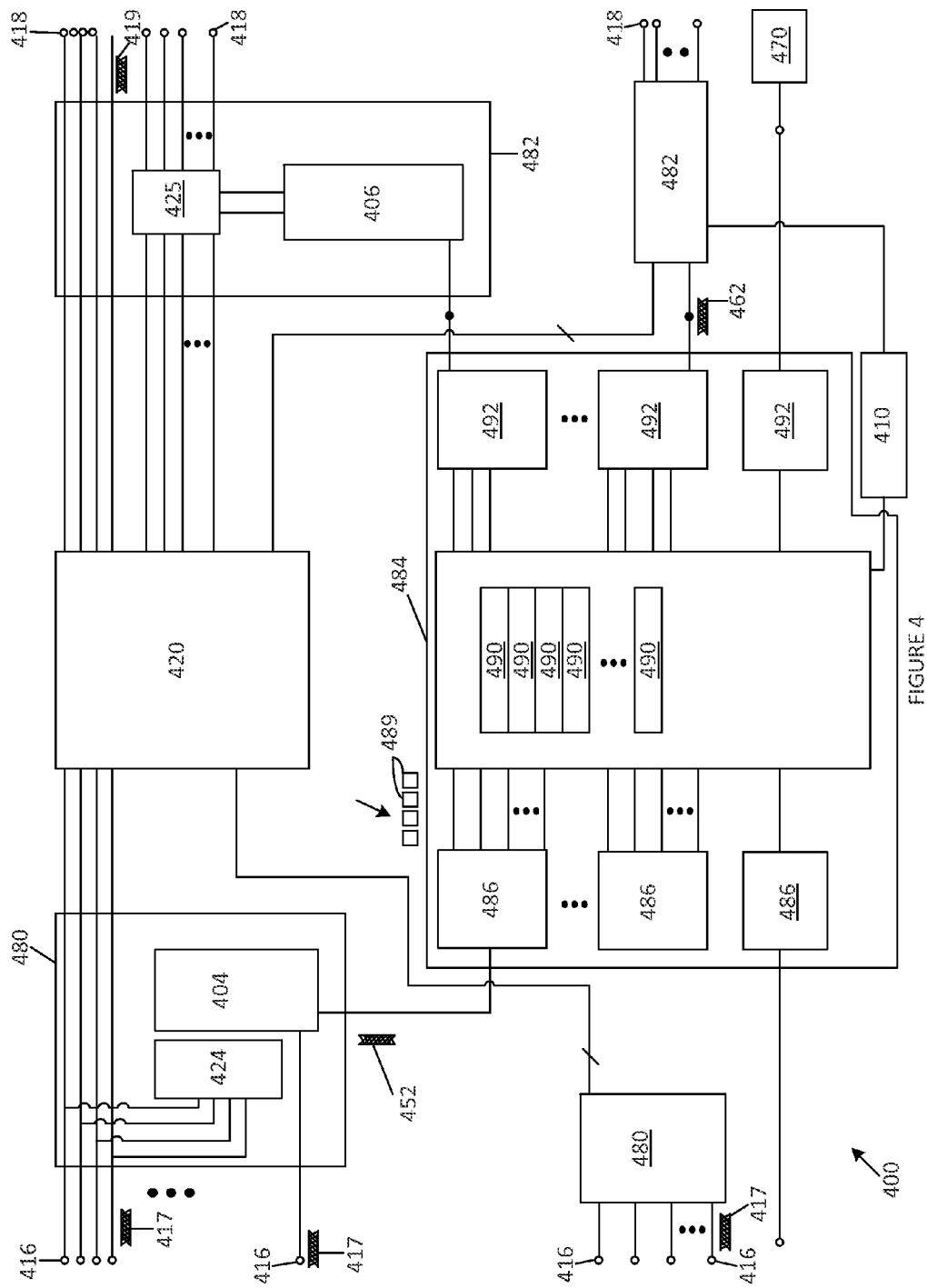
FIG. 4 illustrates yet another signal routing system.
Figure 5:
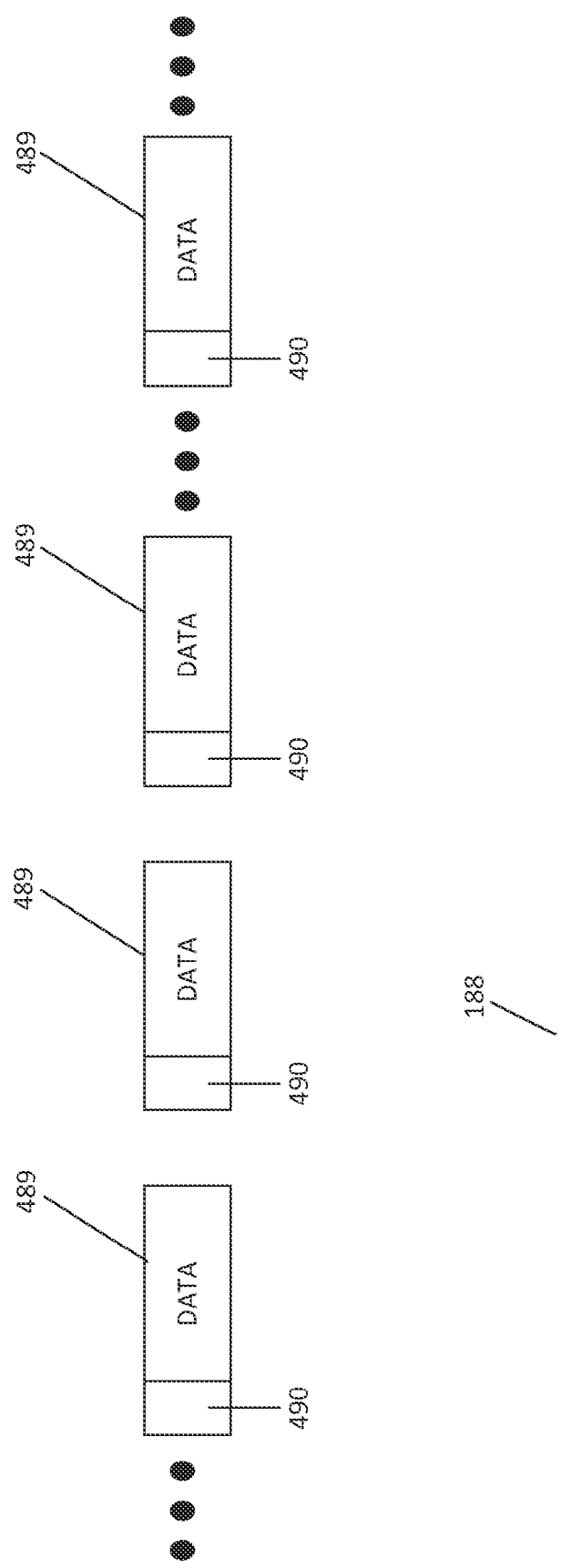
FIG. 5 illustrates a packetized signal of the system of FIG. 4.

Reference is next made to FIGS. 4 and 5, which illustrate another system 400. Components of system 400 that are similar to components of systems 100 and 300 are identified by similar reference numerals. System 400 includes a plurality of input cards 480, output cards 482 and a packet switched router 484, in addition to components corresponding to those of systems 100 and 300.

Each input card 480 has a plurality of input ports 416 at which a plurality of input signals 417 may be received, including electrical input signals and optical input signals. Controller 410 assigns a unique master signal code to each input signal as it is received. The unique master signal code is used to uniquely identify is signal while it is processed through various components of system 400.

Each input card includes an electrical domain signal aggregation module 424 and an optical domain signal aggregation module 404. Electrical domain input signals 417 are combined through electrical domain signal aggregation module 424 and optical domain signal aggregation module 404 to produce compressed optical signals 452. Each signal 417 is tagged with its corresponding unique master signal code processed through the electrical domain signal aggregation module 424 and optical signal aggregation module 404 such that each signal 417 can be identified using its unique master signal code. Optical domain signals 417, such as signal 417o, received at input ports 416, are also tagged with their corresponding unique master signal codes and may be coupled optical domain signal aggregation module 404 which combines them into compressed optical signals 452. The compressed optical signals 452 are coupled to a packet switched router 484.

Packet switched router 484 includes one or more signal extraction module 486 a memory module 488 and one or more signal transmission modules 492. Like other components of system 400, packet switched router 484 is coupled to and operates under the control of controller 410. Only some of the connections between the controller 410 and other components of system 400 are shown to avoid cluttering FIG. 4.

One or more compressed optical signals 452 may be coupled to each signal extraction module 486. Compressed optical signals 452 may be received by the signal extraction module 486 from one or more input cards 480 or from an external device at an input port 494.

Signal extraction module 486 extracts each signal 417 (or, more precisely, the version of the signal 417 that is included in the compressed optical signal 452). Signal extraction module 475 converts each signal 417 into a corresponding electrical signal and packetizes the signal to form a packetized signal 488 comprising a series of packets 489 corresponding to each signal 417. Referring briefly to FIG. 5, each packet 489 in each packetized signal 488 includes the unique master signal code 490 corresponding to the signal. The signal 417 is divided into portions that are encoded in each packet 489 as a data payload.

Memory module 488 may be any type of memory device that is capable of storing packets 489 generated by the signal extraction module 486. In some embodiments, memory module 488 may be organized into a series of first in-first out (FIFO buffers) 490. As a signal extraction model 486 generates each packet 489 in a packetized stream 488, the packets 489 are stored sequentially in a FIFO buffer 490.

Each signal transmission module 492 is coupled to the memory module 488 to retrieve packets 489 and one or more output ports 494.

Each signal transmission module 492 may be configured by controller 410 to retrieve packets 489 corresponding to one or more packetized stream 488 from the corresponding one or more FIFO buffers 490, convert the packetized streams into one or more optical signals and produce one or more compressed optical signals 462 corresponding to the one or more packetized stream. In some embodiments, the compressed optical signals 462 may be assembled with similar content and structure as described above in relation to signals 152. Each compressed optical signal 462 is made available at an output port 496 to devices 470 coupled to system 400. Some or all of the compressed optical signals 462 may be coupled to an output card 482 while others may be coupled to external devices 470. The output card 482 may include an optical deaggregation module 406 and an electrical deaggregation module 425 for providing one of more output signals 419 corresponding to a packetized signal included in a compressed optical signal 462.

Input cards 480 couple some or all of the input signals 417 to switching fabric 420. Switching fabric 420 operates in a manner similar to switching fabric 110 as described above. Input signals 417 are thus coupled to output ports 418 as output signals 419. Switching fabric 420 operates as a crosspoint switch that coupled an input signal 417 received at one input port 416 to one or more output signals 418. In some embodiments, switching fabric 420 may operate in the electrical domain only to switch electrical domain input signals 417 to output terminals 418. In other embodiments, switching fabric 420 may additional or alternatively include an optical domain switch to couple optical input signal 417 to output terminals 418.

System 400 includes both a crosspoint switch 420 and a packet based router or switch 484. Input signals 417 may be coupled through one or both of the crosspoint switch and the packet based router.

In some embodiments, a system may include only a packet based router and may not include a crosspoint switching fabric 420. In such embodiments, input signals 417 are available to external devices 470 as part of a compressed optical signal 452.

The present invention has been described here by way of example only. Various modification and variations may be made to these exemplary embodiments without departing from the spirit and scope of the invention, which is limited only by the appended claims.

The invention claimed is:

1. A signal routing system comprising:
    a plurality of input ports for receiving a first plurality of input signals;
    a plurality of output ports for transmitting a plurality of output signals;
    a crosspoint switch for coupling each of the input ports to one or more of the output ports to allow each input signal to be coupled to one or more output ports;
    an electrical aggregation module for combining a second plurality of input signals selected from the first plurality of input signals, the second plurality of input signals being electrical-domain signals and combined into one or more compressed signals, wherein each of the compressed signals corresponds to two or more of the first plurality of input signals; and
    an optical aggregation module for converting and combining a plurality of the compressed signals into optical signals corresponding to the second plurality of input signals, wherein the optical aggregation module is coupled to a communication network.

2. The signal routing system of claim 1 further comprising:
    an optical deaggregation module coupled to the communication network for receiving an optical signal and deaggregating a plurality of compressed signals from the optical signal;
    an electrical deaggregation module for deaggregating the compressed signals to form video signals corresponding to the received optical signal, wherein the electrical deaggregation module is coupled to the crosspoint switch to provide the video signals to the crosspoint switch, wherein the crosspoint switch may be configured to couple the video signals to one or more of the output ports.

3. The signal routing system of claim 1 further comprising a controller coupled to the crosspoint switch to coordinate the operation of the crosspoint switch with other components of the system.

4. The signal routing system of claim 1 wherein at least some of the first plurality of input signals are electrical signals and wherein the crosspoint switch is configured to switch electrical domain signals between the input ports and output ports.

5. The signal routing system of claim 1 wherein at least some of the first plurality of input signals are optical signals and wherein the crosspoint switch is configured to switch optical domain signals between the input ports and output ports.

6. The signal routing system of claim 1 wherein the electrical aggregation module includes one or more signal compression modules.

7. The signal routing system of claim 1 wherein the electrical aggregation module includes one or more signal multiplexing modules.

8. A signal routing system comprising:
    a plurality of input cards for receiving a first plurality of input signals;
    a plurality of output cards for transmitting a plurality of output signals;
    a crosspoint switch coupled to the input cards and to the output cards for receiving at least some of the first plurality of input signals and for switching at least some of the first plurality of input signals to one or more of the output cards; and
    a packet switched router coupled to the input cards for receiving one or more optical signals, each of the optical signals corresponding to one or more of the first plurality of input signals,
    wherein at least some of the input cards include:
        one or more input ports for receiving the first plurality of input signals;
        an electrical aggregation module for combining a second plurality of input signals into a one or more of the compressed signals, the second plurality of input signals being electrical-domain signals; and
        an optical aggregation module for combining a plurality of the compressed signals into optical signals corresponding to the first plurality of the input signals, wherein the optical aggregation module is coupled to the packet switched router.

9. The signal routing system of claim 8, wherein at least some of the input cards include:
    one or more input ports for receiving one or more optical-domain input signals.

10. The signal routing system of claim 8 further including one or more signal extraction modules, wherein at least some of the signal extraction modules are coupled between one of the input cards and the packet switched router to receive optical signals and to provide packetized signals corresponding to one or more optical signals.

11. The signal routing system of claim 8 further including one or more signal transmission modules for retrieving packetized signals from the packet switched router and for providing one or more compressed optical signals corresponding to the retrieved packetized signals.

12. The signal routing system of claim 11 wherein at least some of the signal transmission modules is coupled to one of the output cards to provide one or more compressed optical signals to the coupled output card.

13. The signal routing system of claim 8 wherein the coupled output cards include an optical deaggregation module and an electrical deaggregation module for providing one of more output signals corresponding to a packetized signal included in a compressed optical signal.

14. The signal routing system of claim 8 further comprising a controller coupled to the crosspoint switch to coordinate the operation of the crosspoint switch with other components of the system.

15. The signal routing system of claim 8 further comprising a controller coupled to the packet switched router to coordinate the operation of the packet switched router with other components of the system.

16. A method of routing signals, the method comprising:
receiving a plurality of input signals at a plurality of input ports;
coupling at least some of the input signals to a crosspoint switch, wherein the crosspoint switch is coupled to a plurality of output ports;
within the crosspoint switch, coupling at least some of the input ports to one or more of the output ports thereby transporting at least some of the input signals to such output ports;
generating one or more optical signals, wherein each of the optical signals corresponds to one or more of the input signals, and wherein generation of optical signals comprises compressing the one or more of the input signals in electrical domain; and
providing the optical signals to a communication network.

17. The method of claim 16 including generating the optical signals by aggregating the one or more of the input signals.

18. The method of claim 16 including generating the optical signals by aggregating the one or more of the input signals in the electrical domain and in the optical domain.

19. The method of claim 16 including aggregating the input signals by multiplexing the input signals.

20. The method of claim 16 including receiving optical signals from the communication network and deaggregating the received optical signals to extract one or more signals encoded in the received optical signals.

21. The method of claim 20 further including coupling the extracted signals to the output ports.

22. A method of routing signals, the method comprising:
receiving a plurality of input signals at a plurality of input ports;
coupling at least some of the input signals to a crosspoint switch, wherein the crosspoint switch is coupled to a plurality of output ports;
within the crosspoint switch, coupling at least some of the input ports to one or more of the output ports thereby transporting at least some of the input signals to such output ports;
generating one or more optical signals, wherein each of the optical signals corresponds to one or more of the input signals, and wherein generation of optical signals comprises compressing the one or more of the input signals in electrical domain; and
providing the optical signals to a packet switched router.

23. The method of claim 22 further comprising:
extracting one or more input signals from the one or more optical signals;
converting each of the extracted input signals into a packetized signal; and
storing each of the packetized signals in a memory module of the packet switched router.

24. The method of claim 23 further including:
retrieving one or more packetized streams from the memory module; and
generating one or more compressed optical signals corresponding to the retrieved packetized streams.

25. The method of claim 24 further including:
deaggregating at least some of the compressed optical signals to form one or more output signals and providing the output signals at one or more of the output ports.

26. The method of claim 22 wherein at least some of the plurality of input signals are electrical domain signals.

27. The method of claim 22 wherein at least some of the plurality of input signals are optical domain signals.

28. A signal routing system comprising:
a plurality of input ports for receiving a first plurality of input signals;
a plurality of output ports for transmitting a plurality of output signals;
a crosspoint switch for coupling each of the input ports to one or more of the output ports to allow each input signal to be coupled to one or more output ports;
an electrical aggregation module for combining a second plurality of input signals selected from the first plurality of input signals into one or more compressed signals, wherein each of the compressed signals corresponds to two or more of the first plurality of input signals;
an optical aggregation module for combining a plurality of the compressed signals into optical signals corresponding to the second plurality of the input signals, wherein the optical aggregation module is coupled to a communication network;
an optical deaggregation module coupled to the communication network for receiving an optical signal and deaggreqating a plurality of compressed signals from the optical signal;
an electrical deaggregation module for deaggregating the compressed signals to form video signals corresponding to the received optical signal, wherein the electrical deaggregation module is coupled to the crosspoint switch to provide the video signals to the crosspoint switch, wherein the crosspoint switch may be configured to couple the video signals to one or more of the output ports.

29. A method of routing signals, the method comprising:
receiving a plurality of input signals at a plurality of input ports;
coupling at least some of the input signals to a crosspoint switch, wherein the crosspoint switch is coupled to a plurality of output ports;
within the crosspoint switch, coupling at least some of the input ports to one or more of the output ports thereby transporting at least some of the input signals to such output ports;
generating one or more optical signals, wherein each of the optical signals corresponds to one or more of the input signals;
providing the optical signals to a packet switched router;
extracting one or more input signals from the one or more optical signals;
converting each of the extracted input signals into a packetized signal; and
storing each of the packetized signals in a memory module of the packet switched router.

30. The method of claim 29 further including:

retrieving one or more packetized streams from the memory module; and generating one or more compressed optical signals corresponding to the retrieved packetized streams.

* * * * *

UNITED STATES PATENT AND TRADEMARK OFFICE
CERTIFICATE OF CORRECTION

| | | |
|---|---|---|
| PATENT NO. | : 8,891,963 B2 | Page 1 of 1 |
| APPLICATION NO. | : 13/607223 | |
| DATED | : November 18, 2014 | |
| INVENTOR(S) | : Rakesh Patel | |

It is certified that error appears in the above-identified patent and that said Letters Patent is hereby corrected as shown below:

On the title page in the illustrative figure reference numeral 120 has been added In the drawings 1. Sheet 1 of 5, Figure 1, reference numeral 120 has been added Signed and Sealed this
Sixth Day of October, 2015

Michelle K. Lee
*Director of the United States Patent and Trademark Office*